US007136282B1

(12) United States Patent
Rebeske

(10) Patent No.: US 7,136,282 B1

(45) Date of Patent: Nov. 14, 2006

(54) TABLET LAPTOP AND INTERACTIVE CONFERENCING STATION SYSTEM

(76) Inventor: Carlton Rebeske, 2654 N. Robin La., Mesa, AZ (US) 85213

( * ) Notice: Subject to any disclaimer, the term of this patent is extended or adjusted under 35 U.S.C. 154(b) by 96 days.

(21) Appl. No.: 10/753,021

(22) Filed: Jan. 6, 2004

(51) Int. Cl.
*G06F 1/16* (2006.01)
*G09G 5/00* (2006.01)

(52) U.S. Cl. ........................ 361/683; 361/681; 345/1.1

(58) Field of Classification Search ................ 361/680, 361/681, 683; 345/1.1, 58, 905
See application file for complete search history.

(56) References Cited

U.S. PATENT DOCUMENTS 4,243,986 A 1/1981 Nixon
4,749,364 A 6/1988 Arney et al.
5,038,301 A 8/1991 Thoma, III
5,115,229 A 5/1992 Shalit
5,307,055 A 4/1994 Baskin et al.
5,335,192 A 8/1994 Oshiba
5,384,579 A 1/1995 Nakasuji et al.
5,537,127 A 7/1996 Jingu
5,539,658 A 7/1996 McCullough
5,568,603 A 10/1996 Chen et al.
5,590,021 A 12/1996 Register
5,659,361 A 8/1997 Jin
5,768,163 A * 6/1998 Smith, II .................... 361/683
5,856,819 A * 1/1999 Vossler ....................... 345/102
6,094,341 A 7/2000 Lin
6,211,847 B1 * 4/2001 Jeong ......................... 345/1.1
6,262,785 B1 7/2001 Kim
6,295,038 B1 9/2001 Rebeske
6,343,006 B1 1/2002 Moscovitch et al.
6,532,146 B1 * 3/2003 Duquette .................... 361/681
6,667,878 B1 * 12/2003 Ponx .......................... 361/683
6,909,597 B1 * 6/2005 Tutikawa .................... 361/681
2001/0014006 A1 * 8/2001 Kim et al. .................. 361/683
2001/0054986 A1 * 12/2001 Leman ....................... 345/1.1
2002/0141146 A1 * 10/2002 Mustoe ....................... 361/683
2004/0051679 A1 * 3/2004 Ponx .......................... 345/1.1
2004/0095292 A1 * 5/2004 Ogura ........................ 345/1.1
2004/0264118 A1 * 12/2004 Karidis et al. .............. 361/683

* cited by examiner

*Primary Examiner*—Lisa Lea-Edmonds
(74) *Attorney, Agent, or Firm*—Schmeiser, Olsen & Watts LLP

(57) ABSTRACT

A laptop computer is constructed having a case including a keyboard and containing traditional computer components. A display screen is pivotally secured to the computer case and may be pivoted about the hinge to an operative position wherein an operator can observe the information displayed on the display screen. A second display screen is pivotally secured to the first display screen and is also connected to the computer components within the computer case. The second display screen, when hinged to its operative position displays the same information displayed on the first display screen, but is directed in an opposite direction to permit an operator and an observer to observe the same information viewable on the first and second display screens, respectively.

30 Claims, 6 Drawing Sheets

12
4
10
42
6
8

48
10
44
46
42

TABLET LAPTOP AND INTERACTIVE CONFERENCING STATION SYSTEM

BACKGROUND OF THE INVENTION

1. Technical Field

The present invention relates to laptop computers, and more particularly to portable computers having two displays, one or both of the displays being an interactive touch screen.

2. State of the Art

Computers, particularly laptop computers, in combination with selected peripheral equipment have been designed in the past for utilization by computer operators to make presentations to groups of observers. The techniques utilized when operating such computers are intended for the presentation of selected materials, viewable by the operator on the computer display screen, to several individuals or groups on secondary or supplemental display screens that are large enough for the entire group to observe. Such techniques are common for the presentation of materials in seminars, sales meetings, or similar gatherings wherein it is the intention of the computer operator to display the information available to him on the display screen to a group.

Early versions of such computers, and the implementing software together with the necessary peripheral equipment, were relatively bulky and very expensive. More recent versions of computers allow for a dual screen display for use in presentations where the presenter and observer can look at two separate, but hingedly attached, displays while facing each other for more effective communication. Examples of dual screen laptop computers are shown and described in U.S. Pat. No. 6,343,006 to Moscovitch (issued Jan. 29, 2002) entitled Computer Display Screen System and Adjustable Screen Mount, and Swinging Screens therefore, and U.S. Pat. No. 6,295,038 to Rebeske (issued Sep. 25, 2001), the disclosures of which are hereby incorporated herein by reference for their disclosure of possible structures, operations and functions of laptop computers with multiple display screens known in the art. Each of these patents discloses examples of multiple-screen laptop computers suitable for operators doing sales-type presentations to observers.

While conventional dual-screen displays are effective for giving one-way presentations to an observer, when an observer has a question about something on the display, the observer must either explain the screen in sufficient detail to explain the question to the presenter, or have the presenter move to come see the observer's display. In many cases, this negates much of the benefit of having a second display, because both the presenter and the observer eventually spend some of their time looking at the same display. Attempts to coordinate viewing of multiple displays by multiple people can even disrupt the flow, and therefore the effectiveness, of the presentation.

DISCLOSURE OF THE INVENTION

The present invention relates to a dual-screen presentation laptop with which the observer can interact. Specifically, one or both of the two screens of the laptop computer is touch sensitive so that the observer can provide feedback through the display, can indicate areas of question and concern during the presentation without the presenter needing to view the observer's display, and can individually select options that may assist in directing the presentation. Interaction with the touch sensitive display may include interaction from the observer's finger or other screen-interacting tool such as a touch pen. Additionally, specific embodiments of the invention relate to an interactive conferencing system through which multiple participants can interact with portable displays and see and hear each of the other local and/or remote participants in the conference.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
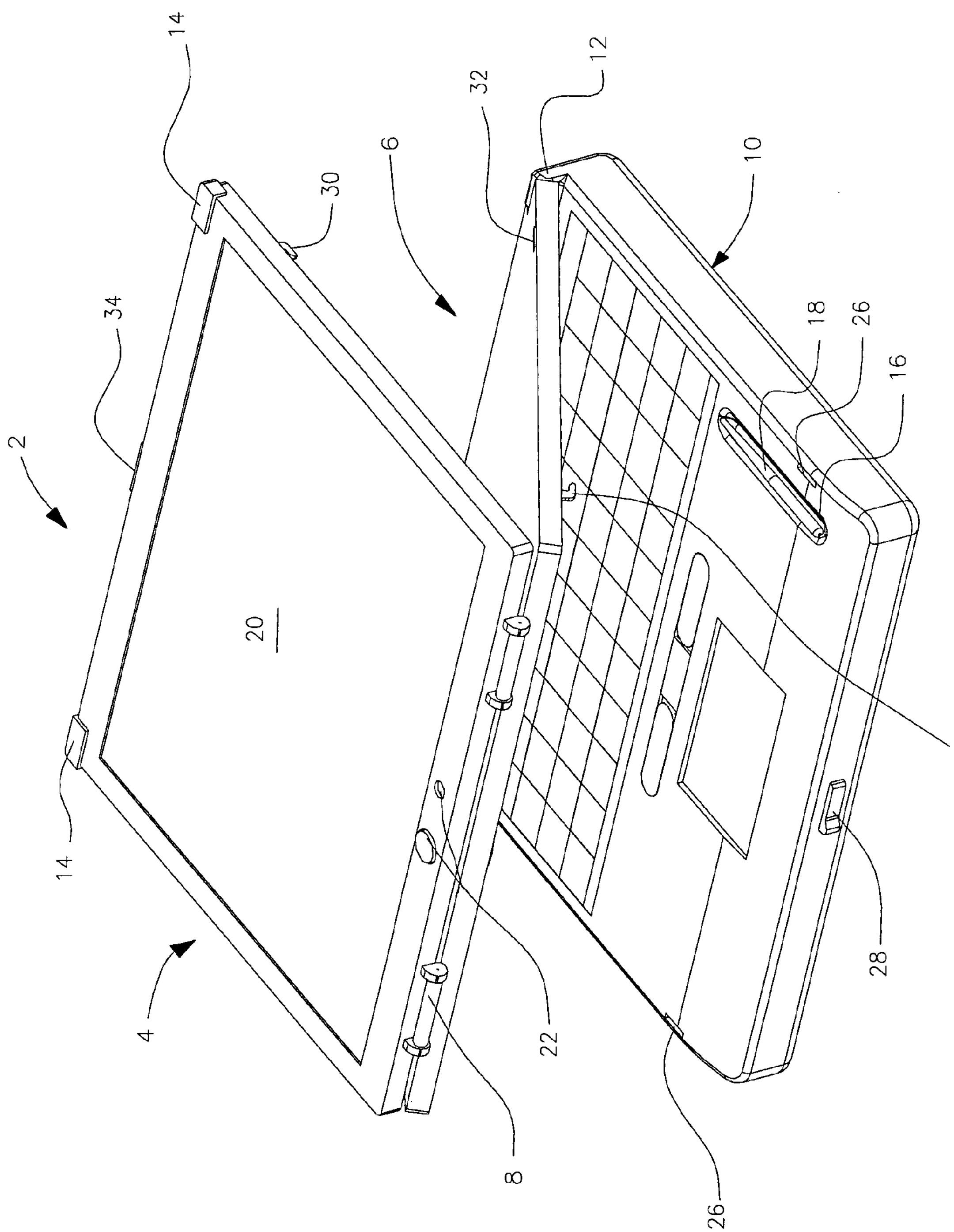
FIG. 1 is a perspective view of an interactive dual-screen laptop computer embodiment of the present invention with the displays arranged for opposing side view.
Figure 2:
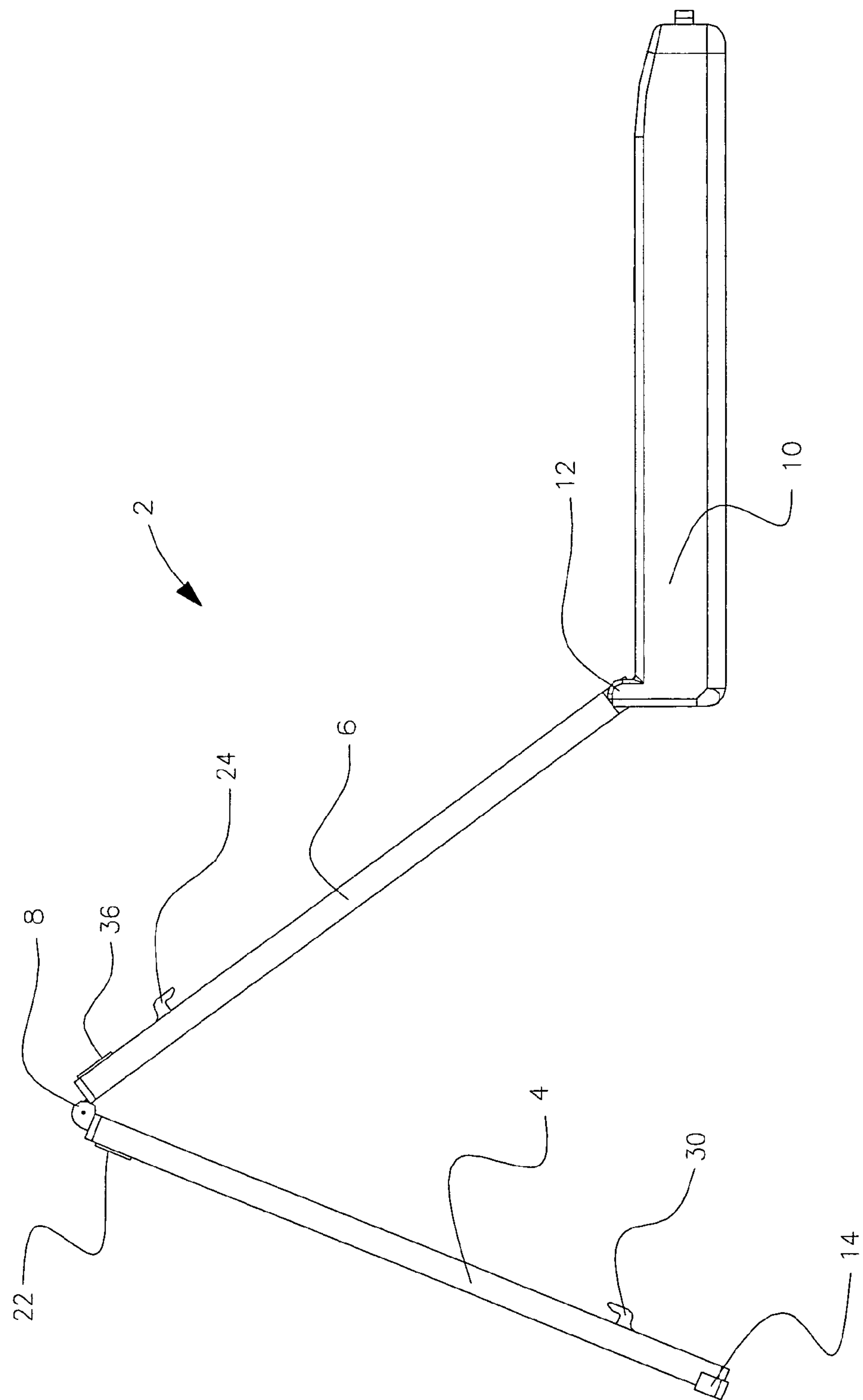
FIG. 2 is a side view of the laptop computer embodiment of FIG. 1.

Referring now to FIGS. 1 and 2, a perspective view of a laptop computer 2 constructed in accordance with the teachings of the present invention is shown. The computer includes a case 10 that may enclose one or more of the usual portable computer components such as processors, memories, including RAM, and hard disk, floppy disk drives, DVD and CD drives, modem cards and similar components presently available in conventional laptop computers. The computer case 10 may also include a keyboard, a touchpad or other cursor control, function keys and other components presently available in conventional laptop computers for interacting with the computer 2. Laptop computers are portable, usually self-powerable computers, having usual desktop computer functions, but in lightweight compact form to facilitate carrying.

The laptop computer 2 of FIG. 1 includes a second display screen 4 pivotally coupled to a first display screen 6 by at least one hinge member 8. The first display screen 6 is also pivotally coupled to the computer case 10 by at least one hinge member 12. Many other coupling devices exist to pivotally couple two components together, such as ball and socket pivots or pivoting track guides. The particular coupling mechanisms through which the second display screen 4 is pivotally coupled to the first display screen 6 and the first display screen 6 is coupled to the computer case 10 are not significant to the invention. Pivoting mechanisms to couple a laptop computer to its display are well known in the art.

FIG. 2 shows the laptop computer of FIG. 1 opened into its dual display position wherein an observer on the computer case 10 side of the computer 2 can view the first display 6 and an observer on the second display 4 side of the computer 2 can view the second display 4. Rubber, or other friction-increasing feet 14 along an edge of the second display 4 housing helps to maintain the position of the pivoting display screens 4 and 6 when in the dual display position as shown in FIG. 2. Alternatively, or additionally, the hinge members 8 or 12, could be adapted to adjust stiffly into positions to maintain the position and orientation of the first and second displays 6 and 4. Such hinge members are common for the hinges between a conventional laptop computer and its display so that the display maintains its relative position and orientation once placed there by an operator.

It is contemplated that according to another aspect of the present invention, the second display screen 4 may be configured so as to be detachable from the first display screen 6 so that the writing tablet portion 4 may be used separately from the laptop computer portion 6 and 10. Detachable hinge members, including without limitation those with removable hinge pins, are well known in the art. To enable the second display screen 4 to be detached from the first display screen 6, the second display screen 4 would also need to comprise its own processor, memory and power supply. The processor and power supply may operate whether or not the second display screen 4 is coupled to the first display screen 6, or may be configured to operate only when the second display screen 4 is detached from the first display screen 6 for separate use.

Referring again to FIG. 1, the computer case 10 optionally includes a recess 16 and a stylus 18 for interacting with a touch sensitive surface 20 on the second display screen 4. While not common to laptop computers, touch sensitive display screens are known in the art for use with public kiosk terminals. The touch sensitive display screen 4 surface 20 includes a plurality of programmable display regions configured to recognize input from an observer interacting with the display screen 4. The display screen 4 may be configured to receive input through manual contact and/or through electronic contact with a specially configured stylus that transmits a signal to the display. Each of these kinds of displays and stylus is well known in the art. One example of a touch sensitive display screen 4 that may be adapted for use with the present invention is the touch sensitive display screen used in the Stylistic 3500 Tablet computer made by Fujitsu Computer Systems Corporation having a base for United States business in Sunnyvale Calif.

A video camera device/microphone 22 may also be included on the second display screen 4 for use in conferencing with the laptop computer 2 as explained more fully below. The video camera device/microphone 22 may be built-in to the housing or otherwise permanently or temporarily attached thereto during use. A similar video camera device/microphone 36 (FIG. 3) may also be included on the first display screen 6.

Like a conventional laptop computer, embodiments of the present invention may include latch elements 24 and 26 through which the first display releasably latches against the computer case 10 through latch catches 26. A latch release 28 is commonly used to release the latch elements 24 and 26 from the latch catches 26. Similar to the latches used for a conventional laptop computer display, but unique to dual display laptops, embodiments of the present invention optionally include one or more latch elements 30 on the back side of the second display screen 4 which interact with corresponding latch catches 32 to releasably latch the second display screen 4 to the back of the first display screen 6. A latch release 34 may also be included to release the latch 30 from the latch catches 32. The latches 24 and 30 may be used to securely latch the laptop computer 2 into its collapsed position (see FIG. 4) for storage, transport or for use as a writing tablet.

The second display screen 4 may be used to provide duplicate information during a presentation. This duplicate information on the second display screen permits the operator and the observer to sit across a table or desk and discuss the information presented on the display screens while the operator is controlling the presentation. It is a relatively easy matter to provide software programming to permit the operator to exclude certain non-essential display matters on the second display screen while leaving those display matters on the first display screen. For example, when describing a document that is being displayed on the display screen, the operator may not want to permit such non-essential information as toolbars, display options, or program information to be displayed on the second display screen that would confuse the observer when reading or interpreting the information on the document being disclosed or displayed on the second display screen.

It is also advantageous when using a laptop configured according to an embodiment of the present invention for the operator to emphasize a particular portion of the information or document being displayed to the observer by simply highlighting or underlining that information as the observer is watching on his display screen; the underlined or highlighted information occurring on the first screen as a result of the operator's actions is therefore automatically presented to the observer by the second screen. This feature enables the operator to simultaneously emphasize certain portions of the information or document to the observer while discussing the matter with the observer. Additionally, because the second display screen of particular embodiments of the present invention includes a touch sensitive surface 20, the observer can also select, highlight or otherwise emphasize particular information to the operator so that the two can more readily interact during the presentation without losing the advantage of using two separate displays.

Figure 3:
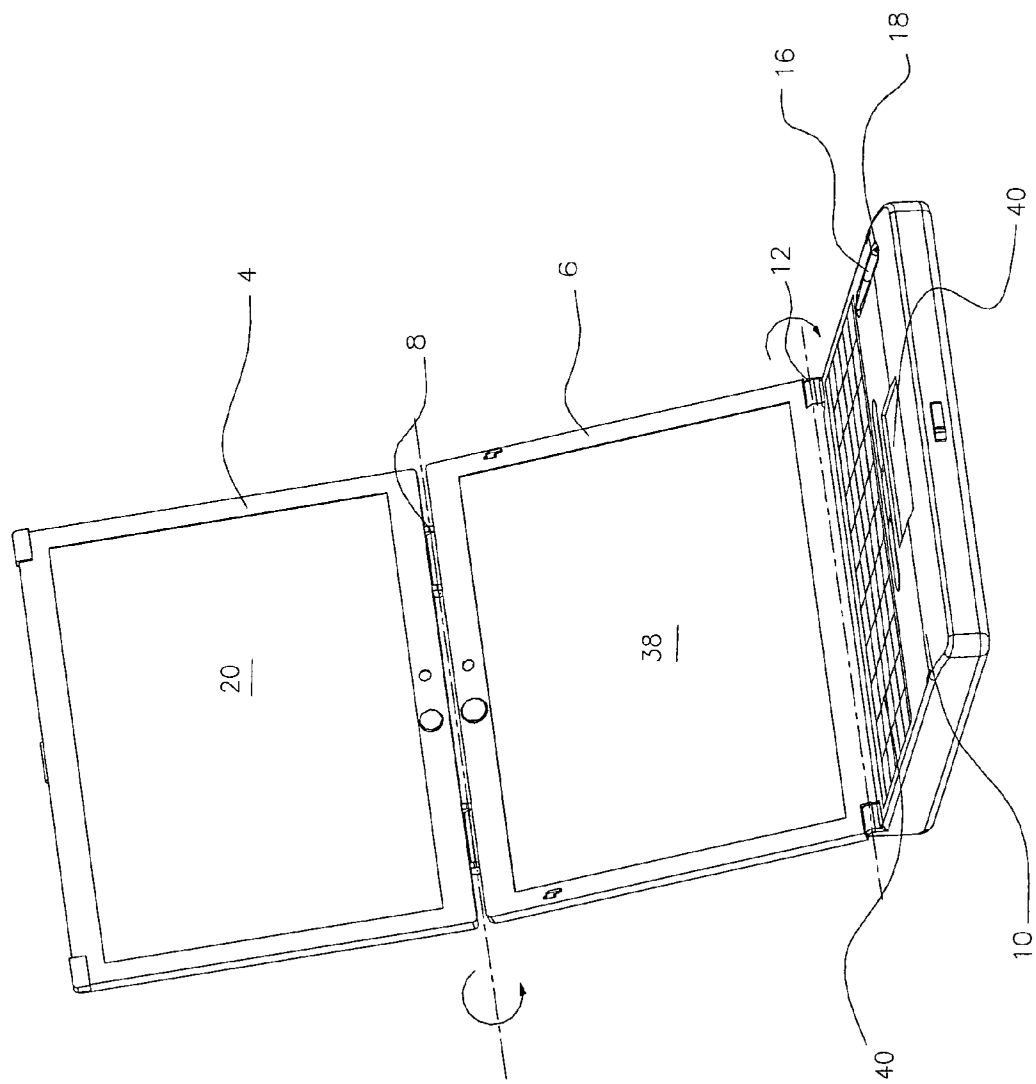
FIG. 3 is a perspective of the laptop computer of FIG. 1 with the displays arranged for single side view.

FIG. 3 illustrates the embodiment of the laptop computer 2 shown in FIG. 1 but with the second display screen 4 pivoted up so that both the first display screen 6 and the second display screen 4 are viewable by the operator of the laptop computer 2. With the laptop computer in this dual screen position, the operator is provided with twice the display area as with only a single display. The second display 4 may be programmed to display the same information as is displayed on the first display 6, may be programmed to operate as an entirely separate display with its own information to display, or may be programmed, along with the first display screen 6, to display half of the information on the first display screen 6 and the second half of the information on the second display screen 4. The first or second display screens 6 or 4 may be provided with an optional sensor to determine the orientation of the second display screen 4, and software may be used to provide the operator with selection of the style of information to be displayed to a single operator using two displays in unison.

Optionally, or alternatively, the first display screen 6 may also include a touch sensitive display surface 38 like the display surface of the second display screen 4 described above. This allows the operator the option of interacting with the computer 2 through the first display screen 6 and through conventional manual inputs 40 such as a keyboard, a touchpad or other cursor control, function keys, and the like.

Figure 4:
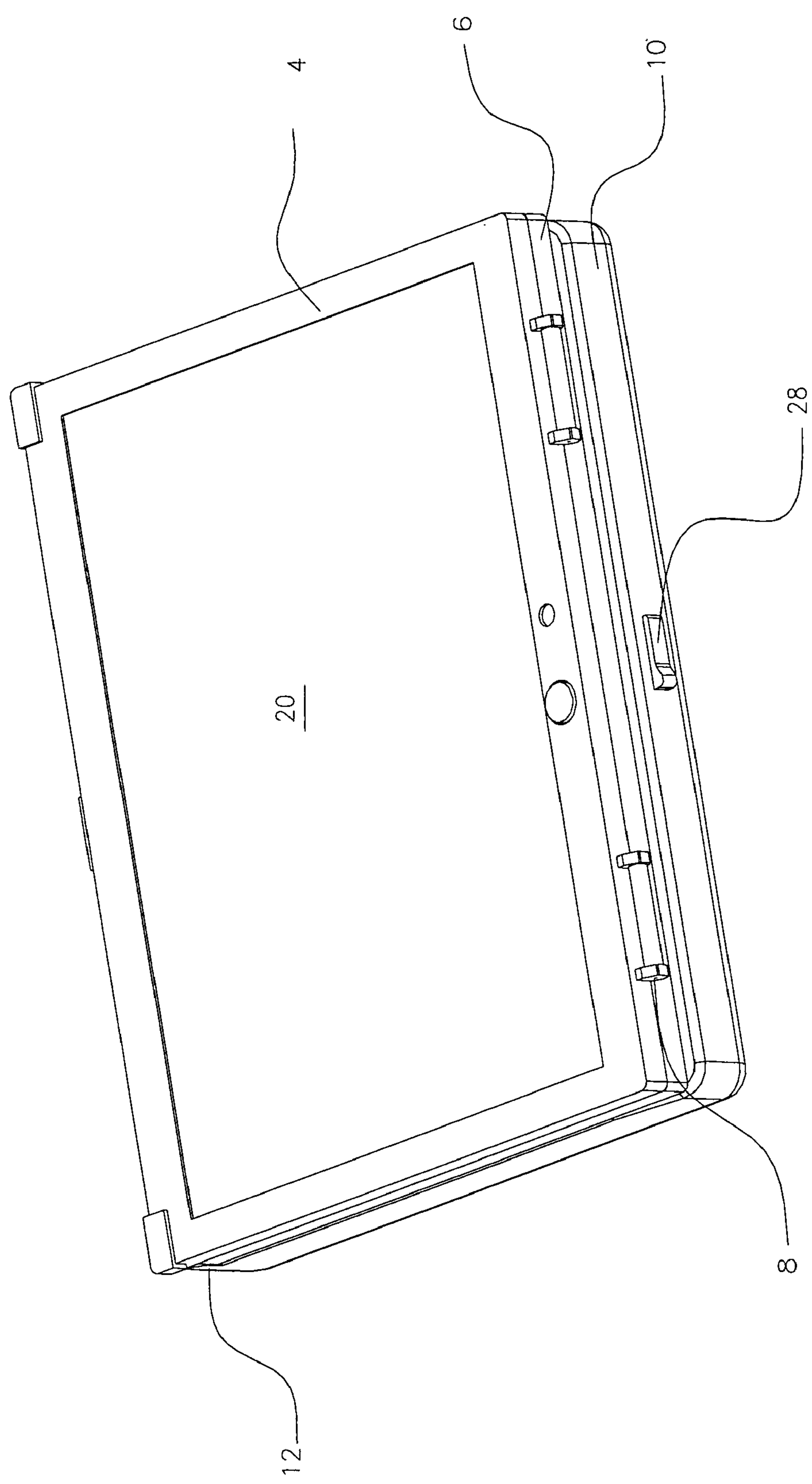
FIG. 4 is a perspective view of the laptop computer of FIG. 1 with the displays in their collapsed position.
Figures 5, 6:
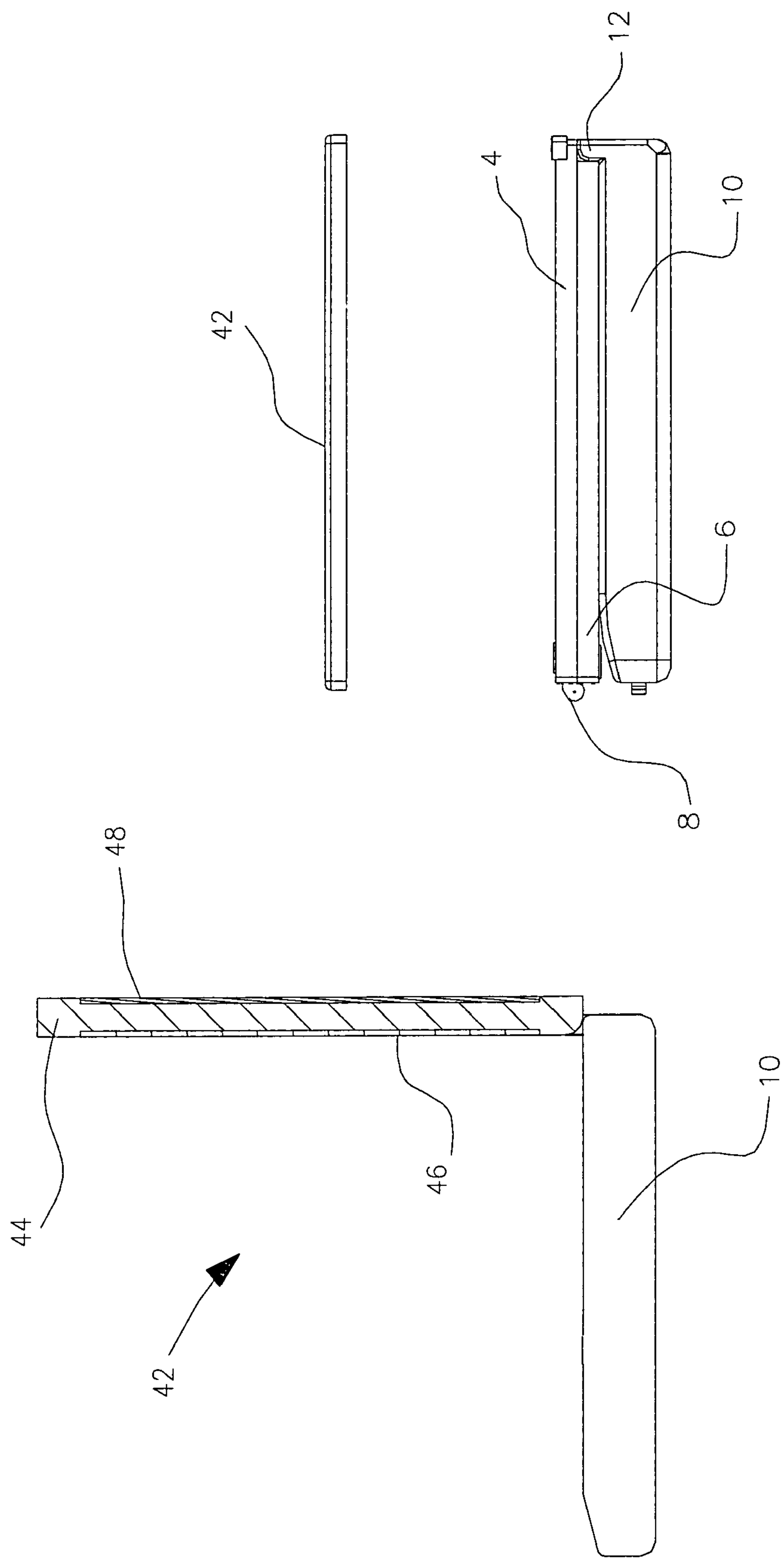
FIG. 5 is a side view of the laptop computer of FIG. 1 in its collapsed position illustrating a protective cover.
FIG. 6 is a side view of an alternative embodiment of the present invention having two displays housed within the same housing.

FIG. 4 illustrates an embodiment of the laptop computer 2 of the present invention in its collapsed position. In this position, the laptop computer 2 may be used as a writing tablet. FIG. 5 illustrates an optional screen-protecting cover 42 for use with the embodiment of the invention shown in FIG. 1. The cover 42 may be formed of any formable material such as plastic or metal. It is contemplated that the cover will snap onto the second display screen 4, though it may be configured to just fit over the display screen 4.

Distinct from other writing tablet computers, embodiments of the present invention are useful as presentation and conferencing computers as well as tablet computers. To date, writing tablet computers have found only limited usability in particular limited fields, such as the medical field, where relatively little input is required. It is believed that due to the perceived limited functionality of writing tablets, the use of writing tablets in the business industry has failed. Similarly, the use of two-screen laptop computers has similarly not been very successful. Through this unique combination of a writing tablet and a two-screen laptop computer, it is believed that both industries will now be able to find marketing success and greater usefulness.

FIG. 6 illustrates an alternative embodiment of a laptop computer configured according to an embodiment of the present invention. In the embodiment shown in FIG. 6, a unitary display housing 44 houses both a first display 46 and a second touch sensitive display 48. The unitary display housing 44 is pivotally coupled to the computer case 10. In this embodiment, the second display screen 48, when the laptop computer 42 is in its collapsed position, operates as a writing tablet as in previous embodiments. The first and second display screens 46 and 48, however, are not pivotally coupled to each other but are included within the same display housing 44. This provides for a more compact design. A substantially rigid cover, such as that shown in FIG. 5, may be used to protect and cover the second display screen 48.

As with other embodiments of the present invention using two display screens, using appropriate software and display drivers, the display screens may be selectively turned off when not in use to preserve energy and maintain privacy. For example, when the laptop computer is in its collapsed position (FIG. 4), there is no need for the first display screen to display information. It is contemplated that the laptop computer will be programmed to automatically turn off the first display screen when it is placed in its collapsed position. For another example, when the laptop computer is open (FIGS. 2 and 6) but there is no second observer opposite the computer operator, there is no need for the second display screen to be on. In fact, it would be undesirable to display information on the second screen because of the needlessly spent energy and the likelihood of others watching potentially private information. It is contemplated that the laptop computer will be programmed to provide the operator with the option of turning on the second display and/or selecting the operation mode of the laptop computer (e.g. dual screen operator (FIG. 3), dual screen observer (FIGS. 2 and 6), writing tablet (FIG. 4), single screen operator (FIGS. 2 and 6), etc.).

Figure 7:
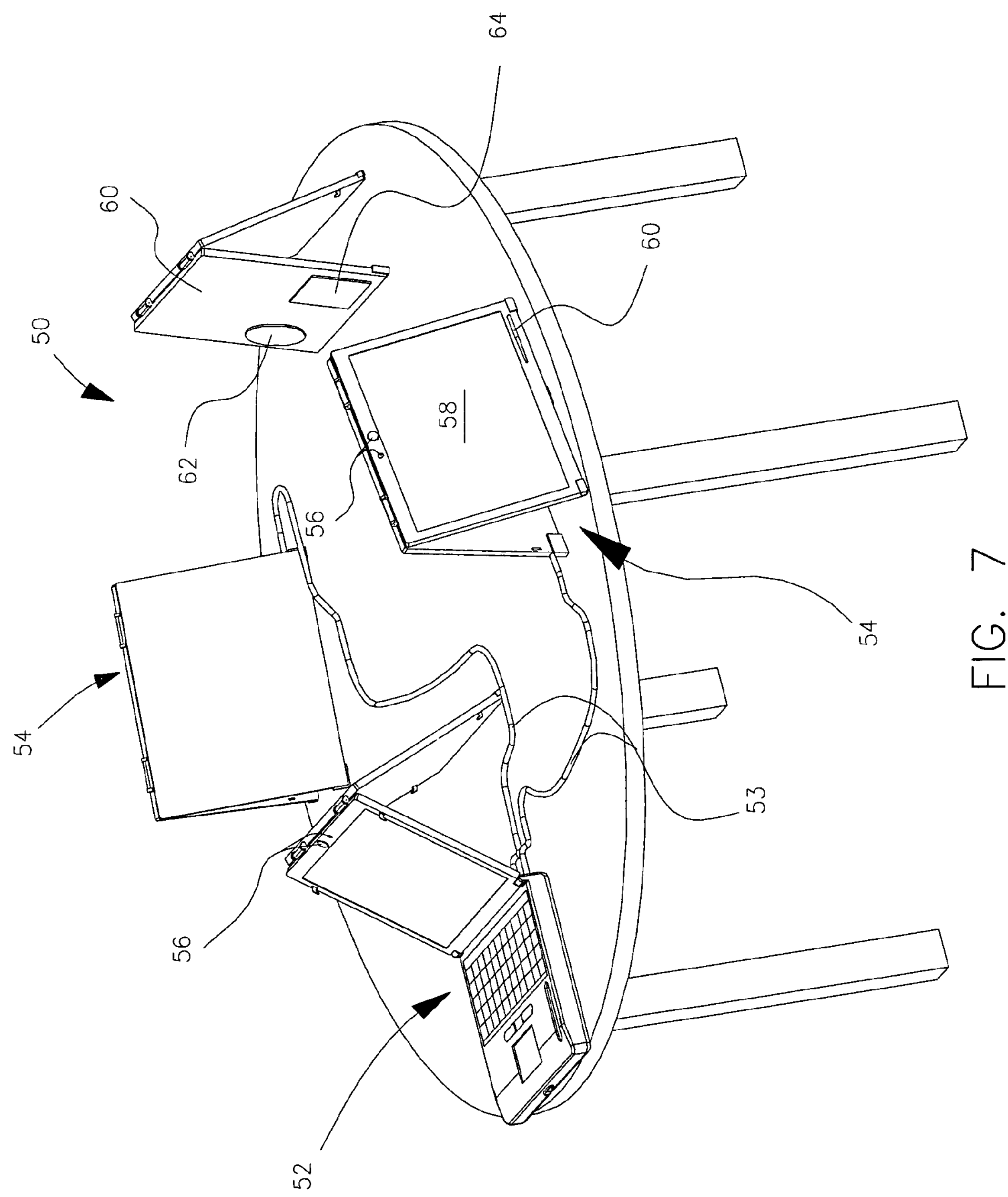
FIG. 7 is a perspective view of a conference system configured according to an embodiment of the present invention.

FIG. 7 illustrates a laptop computer conferencing system 50 employing aspects of the earlier described invention. The laptop computer conferencing system 50 includes a laptop computer 52 with a video camera/microphone 56 for recording video and audio images of a computer operator. Like earlier embodiments of the invention, the laptop computer 52 may include a second display screen that is touch sensitive, though this aspect of the invention is not required for the laptop computer for use with the conferencing system embodiment. Other appropriately configured laptop computers may similarly perform the necessary functions of the laptop computer 52 needed for the system described with reference to FIG. 7. One or more interactive display monitors 54 are coupled to the laptop computer 52 through cables 53 that include both data signals and power. The display monitors are, therefore, powered through the laptop computer 52, through its battery or other power source.

Conventional monitors for video conferencing each require their own independent power source. In many environments there are an insufficient number of separate plugs for a plurality of video conferencing monitors, and in other environments there are no separate plugs at all. By providing an outlet on the laptop computer 52 that supplies power to the separate displays 54, and a properly configured, insulated and shielded cable to supply both the data and power to the displays 54, separate outlets are not required and video conferencing may be done virtually anywhere. Each display 54 may include a video camera/microphone device 56 for recording video and audio images, and a touch sensitive display surface 58 and optional stylus 59 to allow the observer to interact with the display. Additionally, a wireless monitor 60 may be used that includes its own power supply 64 and a wireless transmitter/receiver 62. Transmission and reception of wireless signals between computer processors is well known in the industry and may be accomplished through any number of methods such as WiFi, Blue Tooth, radio frequency, and any other method known in the industry.

In one particular embodiment, each display 52, 54 and 60 (the laptop also acting as a display), includes an interactive interface (either through the keyboard or screen for the laptop 52 and through the touch sensitive screen for the other monitors 54 and 60), and a video camera/microphone 56. The laptop computer includes software configured to identify each monitor 54 or 60 and receive video/audio signals as well as any interaction received from the observer of each monitor 54 or 60. Each display 52, 54 and 60 then displays the video and audio signals received from each of the other monitors, the video signals being displayed in separate windows on the display, and the audio signals playing as if all of the participants were in the same room. It is believed that those of ordinary skill in the audio/video signal processing art will readily be able to display and play audio/video signals as explained herein from the description provided. It is certainly contemplated that the conferencing system of the present invention will not merely be used by participants around the same table as is shown in FIG. 7, but that the participants around the table will conference with other participants in remote locations, perhaps through the Internet or other communication medium.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A laptop computer comprising:

a touch sensitive first display screen pivotally attached to a laptop computer housing the laptop computer having at least a keyboard, a microprocessor and computer memory; and a touch sensitive second display screen receiving input from an observer through the touch sensitive second display screen, the touch sensitive second display screen coupled to the first display screen, the touch sensitive second display screen adjustably held in a first position facing generally opposite to the touch sensitive first touch screen, in which first position a first person utilizing the touch sensitive first display screen and the observer who is a second person will be facing each other and will also be facing the touch sensitive first display screen and the touch sensitive second display screen, respectively.

2. The laptop computer of claim 1, wherein the second display screen is hingedly attached to the first display screen.

3. The laptop computer of claim 2, wherein the second display screen has a back surface that faces a back surface of the first display screen in storage, the first display screen having a front, viewing surface that faces the keyboard in storage such that the front, viewing surface of the second display screen is exposed when the first display screen is in storage.

4. The laptop computer of claim 1, further comprising a snap fit, protective cover removably covering the second display screen in a storage condition.

5. The laptop computer of claim 1, further comprising a protective cover detachably snap fitted on the second display screen.

6. The laptop computer of claim 1, further comprising a touch screen pen coupled to the second display screen.

7. The laptop computer of claim 1, further comprising a cord connector configured to supply both electrical power and data signals to a separate computer display.

8. A laptop computer comprising:

a base housing at least a keyboard, a microprocessor and computer memory;

a first display screen hingedly attached to the base;

a second display screen pivotally attached to the first display screen, the second display screen being pivoted from a first position in which the second display screen is adjacent the first display screen, to a second position in which a bottom edge of the second display screen is spaced from a bottom edge of the first display screen, the first and second display screens facing different directions when the second display screen is pivoted to its second position; wherein:

the second display screen is a touch sensitive display screen and receives input from an observer through the second display screen;

the second display screen has a power connection and a display signal connection with the laptop computer and receives power and display signals therefrom;

the first display screen displays the same matter as is displayed on the second display screen; and a stylus coupled to the second display screen.

9. The laptop computer of claim 8, wherein the first display screen is also a touch sensitive display screen.

10. The laptop computer of claim 8, wherein the second display screen has a back surface that faces a back surface of the first display screen in the first position, the first display screen having a front, viewing surface that faces the keyboard in storage such that the front, viewing surface of the second display screen is exposed when the first display screen is in storage.

11. The laptop computer of claim 8, further comprising a snag fit, protective cover removably covering the second display screen in a storage condition.

12. The laptop computer of claim 8, further comprising a protective cover detachably snap fitted on the second display screen.

13. The laptop computer of claim 8, further comprising a cord connector configured to supply both electrical power and data signals to a separate computer display.

14. A laptop computer conferencing system comprising:

a laptop computer having at least a keyboard, a microprocessor, computer memory, and a laptop display screen;

a touch sensitive first supplemental display screen;

the laptop computer further comprising a cord connector supplying both electrical power and a display signal to the touch sensitive first supplemental display screen; and matter displayed on the laptop display screen, the matter receivingly connected to the touch sensitive first supplemental display screen, the matter being modified via input through the touch sensitive first supplemental display screen.

15. The laptop computer conferencing system of claim 14, wherein:

the laptop display screen is a touch sensitive laptop display screen; and the touch sensitive first supplemental display screen displays the same matter as the matter displayed on the touch sensitive laptop display screen, and the matter on the touch sensitive first supplemental display screen is modified via input through the touch sensitive laptop display screen.

16. The laptop computer conferencing system of claim 14, wherein the touch sensitive first supplemental display screen comprises a video camera and a microphone.

17. The laptop computer conferencing system of claim 14, further comprising a second supplemental display screen coupled to the laptop computer by an integrated cable that supplies both electrical power and display signals to the second supplemental display screen, wherein the second supplemental display screen is a touch sensitive display screen displaying the same matter as is displayed on the touch sensitive laptop and first display screens.

18. A method of using a laptop computer, the method comprising:

utilizing a first touch sensitive screen and a second touch sensitive screen operably connected to a laptop computer;

displaying the same matter on the second touch sensitive screen as on the first touch sensitive screen;

a first viewer viewing the first touch sensitive screen and a second viewer viewing the second touch sensitive screen;

inputting modifications to the matter via the first touch sensitive screen and the second touch sensitive screen; and displaying the modifications on each of the first and second touch sensitive screens.

19. The method of claim 18, further comprising:

utilizing a camera and a microphone integral with each screen; and transmitting a video image and a voice from one of the screens to the other of the screens via the laptop computer.

20. The method of claim 19, further comprising:

locating at least one additional screen remotely; and operatively connecting the at least one additional screen to the laptop computer via a wireless connection.

21. The method of claim 20, further comprising:

utilizing a plurality of screens including the at least one additional screen; and operatively connecting the plurality of screens to the laptop computer.

22. The method of claim 18, wherein the step of inputting comprises inputting to at least one of the touch screens with a stylus.

23. The method of claim 18, wherein the step of inputting modifications to the first and second touch screens comprises inputting to the first and second touch screens with first and second respective styluses.

24. The method of claim 18, further comprising holding the second screen in a predetermined position, wherein the step of holding comprises utilizing friction increasing feet on a lower edge of the second screen.

25. The method of claim 18, further comprising selectively holding the second screen in each of two positions during two respective in-use applications, the two positions comprising a first position facing generally opposite to the first screen and a second position above the first screen and facing generally in the same direction as the first screen, thus expanding a display area for the user of the first screen; and displaying different matter on each of the first and second screens when the second screen is in the second position.

26. The method of claim 18, further comprising protecting the second screen in a non-use position, wherein the step of protecting comprises snap locking a snap lock cover onto the second screen in a covering relation.

27. The method of claim 18, further comprising latching the second screen to the first screen and latching the first screen to the laptop computer in a non-use position.

28. The method of claim 18, further comprising forming a tablet laptop by latching the second screen to the first screen and latching the first screen to the laptop computer in a use position as a tablet laptop.

29. The method of claim 18, wherein the step of utilizing comprises supporting the first touch screen directly on the laptop computer, the method further comprising the second viewer operating a processor in the laptop computer through the second screen.

30. The method of claim 18, wherein:

the second screen is one of a plurality of supplemental display screens;

the step of utilizing further comprises utilizing the plurality of supplemental display screens operably connected to the laptop computer; and the method further comprises controlling displays on the first screen and the second screen via input through another of the supplemental display screens.

* * * * *

UNITED STATES PATENT AND TRADEMARK OFFICE

CERTIFICATE OF CORRECTION

PATENT NO. : 7,136,282 B1
APPLICATION NO. : 10/753021
DATED : November 14, 2006
INVENTOR(S) : Rebeske It is certified that error appears in the above-identified patent and that said Letters Patent is hereby corrected as shown below:

Col. 8, Line 4
Claim 11 should read as follows: -- The laptop computer of claim 8, further comprising a snap fit, protective cover removably covering the second display screen in a storage condition.--

Signed and Sealed this

Twentieth Day of February, 2007

JON W. DUDAS
*Director of the United States Patent and Trademark Office*